(12) United States Patent
Hornig (10) Patent No.: US 8,177,239 B2
(45) Date of Patent: May 15, 2012

(54) ELASTOMERIC SEALING ELEMENT

(75) Inventor: Roy Hornig, Bad Urach (DE)

(73) Assignee: ElringKlinger AG, Dettingen (DE)

( * ) Notice: Subject to any disclaimer, the term of this patent is extended or adjusted under 35 U.S.C. 154(b) by 1135 days.

(21) Appl. No.: 11/881,583

(22) Filed: Jul. 27, 2007

(65) Prior Publication Data

US 2009/0008879 A1   Jan. 8, 2009

(30) Foreign Application Priority Data

Jul. 4, 2007  (DE) .................. 10 2007 032 149

(51) Int. Cl.
*F16J 15/10* (2006.01)
*F16J 15/12* (2006.01)
*C08F 8/00* (2006.01)
*C08L 27/12* (2006.01)

(52) U.S. Cl. ............ 277/650; 428/36.91; 525/191; 525/199; 277/651

(58) Field of Classification Search .......... 277/568, 277/650, 590, 316, 651, 652; 428/36.91, 428/66.4; 525/191, 199
See application file for complete search history.

(56) References Cited

U.S. PATENT DOCUMENTS

| | | | | |
|---|---|---|---|---|
| 4,251,399 A * | 2/1981 | Tomoda et al. | ........... | 525/126 |
| 4,942,906 A | 7/1990 | Igarashi et al. | ........... | 138/126 |
| 5,093,166 A * | 3/1992 | Nishimura | ........... | 428/36.2 |
| 5,116,558 A * | 5/1992 | Wrobel et al. | ........... | 264/46.6 |
| 5,269,539 A * | 12/1993 | Martin | ........... | 277/569 |
| 5,320,888 A * | 6/1994 | Stevens | ........... | 428/36.2 |
| 5,356,681 A * | 10/1994 | Ichikawa et al. | ........... | 428/36.8 |
| 7,135,122 B2 * | 11/2006 | Park | ........... | 216/56 |
| 7,244,329 B2 * | 7/2007 | Park et al. | ........... | 156/272.2 |
| 7,552,520 B2 * | 6/2009 | Wink et al. | ........... | 29/527.1 |
| 7,887,063 B2 * | 2/2011 | Rueger et al. | ........... | 277/596 |
| 2004/0142135 A1 * | 7/2004 | Verschuere et al. | ........ | 428/36.91 |
| 2005/0155690 A1 * | 7/2005 | Park | ........... | 156/60 |
| 2005/0285353 A1 | 12/2005 | Rueger | ........... | 277/596 |
| 2006/0280887 A1 * | 12/2006 | Duke et al. | ........... | 428/36.9 |
| 2007/0045967 A1 * | 3/2007 | Park | ........... | 277/534 |
| 2007/0048476 A1 * | 3/2007 | Park | ........... | 428/36.91 |
| 2008/0284056 A1 * | 11/2008 | Duke et al. | ........... | 264/209.3 |

FOREIGN PATENT DOCUMENTS

| | | |
|---|---|---|
| DE | 33 02 665 A1 | 8/1983 |
| DE | 38 42 284 A1 | 6/1989 |
| WO | WO 90/14389 A2 | 11/1990 |

* cited by examiner

*Primary Examiner* — Alison Pickard (57) ABSTRACT

In order to make an elastomeric sealing element available which is also suitable, in particular, for sealing tasks, with which the highest thermal and chemical resistance is partially required, and at the same time to save on costs and resources it is suggested that the elastomeric sealing element comprise a first and a second sealing section, wherein the first sealing section is produced with the use of a first elastomeric material containing a first cross-linking system, wherein the second sealing section is produced with the use of a second elastomeric material containing a second cross-linking system, wherein the first and the second sealing sections border directly on one another in a seam area and their elastomeric materials are materially joined to one another, and wherein at least one of the two cross-linking systems comprises, in addition, a cross-linking agent for the respectively other elastomeric material.

34 Claims, 3 Drawing Sheets

ELASTOMERIC SEALING ELEMENT

The invention relates to an elastomeric sealing element which is also suitable, in particular, for sealing tasks, for which the highest thermal and chemical resistance is required in certain areas.

In a great number of sealing applications, a seal must be ensured in an environment with a long service life, in which the highest thermal and/or chemical requirements are placed on the sealing element and, at the same time, sealing tasks are also accomplished which require a lower thermal and/or chemical resistance from the sealing element.

Such sealing applications with different requirements placed on the thermal and/or chemical resistance of the sealing materials can, of course, be mastered with sealing elements which ensure, in any case, the highest thermal and/or chemical resistances, wherein elastomeric materials which fulfill such high requirements are, however, generally expensive. High quality, expensive elastomeric materials are also used in the areas, in which the requirements with respect to the thermal and/or chemical resistance are less and this makes the elastomeric sealing element expensive as a whole.

In many cases, the use of separate sealing elements consisting of different elastomeric materials does not represent an equivalent alternative since this makes the handling difficult, in particular, during installation, normally makes a constructional reconfiguration of the components to be sealed necessary and usually makes the exact alignment of the sealing elements which are separated bodily impossible.

In addition, the use of separate sealing elements also means a separate manufacture thereof which results in a considerable cost disadvantage.

The object of the present invention is to suggest elastomeric sealing elements for the tasks specified above which have properties adapted to the local load spectrum and are cheaper to produce.

This object is accomplished in the case of an elastomeric sealing element of the type described at the outset in that this comprises a first and a second sealing section, wherein the first sealing section is produced with the use of a first elastomeric material with a first cross-linking system and wherein the second sealing section is produced with the use of a second elastomeric material with a second cross-linking system, wherein the first and the second sealing sections border directly on one another in a seam area and their elastomeric materials are materially joined to one another, and wherein at least one of the two cross-linking systems comprises a cross-linking agent for the respectively other elastomer.

The present invention facilitates the selective use of a less expensive (first) elastomeric material in the sealing sections, in which the thermal and/or chemical requirements placed on the elastomeric material are less than in a different sealing section which is formed from a highly resistant (second), but generally more expensive elastomeric material. Surprisingly, it has been found that elastomeric materials of a different nature can be materially joined to one another in seam areas, in which they border directly on one another, in such a manner that the tensile strength of the seam area corresponds essentially to the tensile strength of the elastomeric material with a lesser tensile strength or is even better.

This is possible in accordance with the invention in that a cross-linking agent for the other elastomeric material is contained in at least one of the elastomeric materials.

In accordance with the invention, even elastomeric materials which are, per se, incompatible with one another can be materially joined to one another in a seam area in the manner and quality described above. In particular, those first and second elastomeric materials, which cannot be mixed with one another per se, can also be joined to one another, i.e., at seam areas without the measures according to the invention merely forming low adhesion forces relative to one another.

The present invention opens up the possibility of adjusting the properties of the sealing element to the load spectra encountered locally without more than one operating procedure being required for the production. As a result, the cost expenditure in the manufacture is minimized in several respects while, at the same time, sealing elements which are simple to mount are obtained which ensure a precise alignment of the individual sealing areas during assembly.

For the first elastomeric material, the cheaper elastomeric material with a lower thermal and/or chemical resistance, ethylene acrylate elastomers (AEM) and/or low temperature polyacrylate elastomers (e.g., ACM) are particularly suitable, wherein these elastomers can also be used as an elastomeric material in mixtures with one another. In this respect, those AEM and ACM elastomers which comprise so-called cure site monomer units which are accessible to diaminic or bisphenolic cross linking are preferred. The cure site monomer content of these elastomers is normally 1 to 5 phr.

These first elastomeric materials are suitable for a great number of sealing tasks, in particular, for static seals, such as, e.g., cylinder head, valve cover or oil sump gaskets, seals for manual transmissions and automatic transmissions, O rings, seals in the area of intake manifolds and exhaust gas recirculations.

Sealing elements which are stressed dynamically and consist of the first elastomeric materials are, for example, piston sealing rings, in particular, so-called bonded piston seals, as well.

AEM elastomers are obtainable, e.g., from DuPont under the trade name VAMAC®. ACM elastomers are sold by Zeon Chemicals under the trade names Nipol® and HyTemp®. In addition, Tohpe Corporation, Unimatec and Nippon Mectron offer diaminically cross-linkable elastomers of the aforementioned type.

For the second, highly resistant elastomeric material, an FKM elastomer which is cross linked bisphenolically and of which the highest thermal and chemical resistance can be expected, is preferably used. This type of elastomer is obtainable, for example, from DuPont under the trade name Viton® as well as as Tecnoflon® from Solvay Solexis or as Daiel® von Daikin.

AEM or ACM elastomers, on the one hand, and FKM elastomers, on the other hand, are in general incompatible with one another and in direct contact with one another provide only an insufficient joining which already separates in the case of slight tensile forces and so a mechanical resistance of the elastomeric sealing element which allows long service lives is not present without the use of the elastomeric materials and cross-linking systems used in accordance with the invention.

An elastomeric sealing element, which has long service lives and with which the other, for example, second elastomeric material forms a second sealing section which is adapted to other tasks, is obtained only with the use of elastomeric materials to be used in accordance with the invention, of which at least one contains a cross-linking system which comprises a cross-linking agent for the respectively other elastomeric material.

In the case of the elastomeric sealing elements in accordance with the invention, one sealing section can offer high thermal and chemical resistance while another section is formed by a first elastomeric material which offers a less expensive solution for the sealing tasks in the areas which are stressed to a lesser extent. Despite the free selection of the elastomeric materials according to their thermal and/or chemical properties or resistances which is possible in this case, an elastomeric sealing element is obtained which also fulfills considerable mechanical demands and, therefore, allows, in particular, long service lives, as well, since the seam area, in particular, no longer represents a weak spot with respect to the mechanical stressing of the elastomeric sealing element.

When AEM and/or ACM elastomers are used in the first elastomeric material, a cross-linking system is preferably used which comprises a diaminic or a bisphenolic cross-linking agent and optionally a promoter.

Preferred diaminic cross-linking agents for AEM and ACM elastomers are, for example, hexamethylene diamine carbamate, N,N-dicinnamylide diamine carbamate, 4,4-diaminodicyclohexylmethane, m-xylene diamine, 4,4-diaminodiphenylmethane, 4,4-diaminodiphenyl ether and 2,2-bis[4-(4-aminophenoxy)-phenyl]propane which can be used individually or in mixtures. The group of hexamethylene diamines represents additional, suitable diaminic cross-linking agents.

Promoters of the group of tertiary amines are suitable as optional promoters for such cross-linking systems, e.g., VULCOFAC ACT55 or promoters of the guanidine group, in particular, OTBG, DOTG, DPG and/or biguanidine (OTBG=o-tolyl biguanidine, DOTG=di-orthotolyl guanidine, DPG=di-phenyl guanidine).

A further, preferred promoter is obtainable from SEC-Gummimischungen GmbH under the trade name SEC Accelor 50.

The second cross-linking system for the second elastomeric material is preferably a bisphenolic cross-linking agent, in particular, when a material based on an FKM elastomer is used as second elastomeric material. In this case, as well, a promoter is optionally used. In this case, FKM elastomers which can be cross-linked ionically or nucleophilically are especially preferred. Diaminically cross-linkable FKM elastomers which were commonly used previously have today lost their importance on the market and are less preferred in accordance with the invention.

Examples for bisphenolic cross-linking agents which are suitable, in particular, for FKM elastomers are bisphenol AF and bisphenol A.

Typical promoters for the second cross-linking system are phosphonium salts. In addition, the second cross-linking system can contain activators, such as, e.g., alkali and alkaline earth hydroxides or oxides, in particular, $Ca(OH)_2$ or MgO as well as PbO. MgO serves primarily for binding resulting HF. Typical proportions of $Ca(OH)_2$ and MgO in the FKM elastomer material are approximately 3 phr and 5 phr, respectively.

Alkali and earth alkaline hydroxides or oxides, such as, e.g., $Ca(OH)_2$, are of considerable importance for the strength of the resulting join between the elastomeric materials bordering on one another as additive to AEM or ACM as first elastomeric material when FKM is used as second elastomeric material. Although these FKM elastomer activators (e.g., $Ca(OH)_2$) can be disadvantageous for the elastic and mechanical properties of the AEM or ACM elastomers when added to them in amounts which are too great, their addition to the first elastomeric material has decisive advantages in the tendency to bond. Small amounts of 0.35 phr or more already display considerable improvements in the strength of the join to the FKM elastomers.

Excellent results are regularly obtained with proportions of $Ca(OH)_2$ in the first elastomeric material in the range of approximately 0.4 to approximately 0.6 phr. These values also apply for the other alkali and earth alkaline hydroxides and oxides, respectively.

The upper limit of approximately 1.0 phr should preferably be taken into account since above this no additional significant improvements are to be expected and no critical impairment to the AEM or ACM elastomers is to be feared up to this constituent amount.

With a view to the fact that the second elastomeric material is provided for the sealing tasks which are particularly critical thermally and/or chemically, the first cross-linking system will preferably contain a proportion of a cross-linking agent for the second elastomeric material.

Since the first elastomeric material is subject to lesser thermal and/or chemical stressing, the first cross-linking system lends itself to the doping with a cross-linking agent for the other elastomeric material.

It is, of course, within the scope of the present invention alternatively to use a proportion of a cross-linking agent for the first elastomeric material in the second cross-linking system.

In addition, it is within the scope of the present invention not only to equip the first cross-linking system with a proportion of a cross-linking agent for the second elastomeric material but also to dope the second cross-linking system with a proportion of a cross-linking agent for the first elastomeric material.

It has, however, been shown that in many cases the use of a cross-linking agent for the respectively other elastomeric material solely in the one cross-linking system is sufficient to achieve the mechanical strength characteristics described above and, therefore, to achieve long service lives for the elastomeric sealing element according to the invention.

In the case where an AEM-based elastomer is used as first elastomeric material, the proportion of the cross-linking agent for the second elastomeric material contained in the first elastomeric material will amount to approximately 0.25 phr or more.

In addition, in the case where an AEM-based first elastomeric material is used, the proportion of the cross-linking agent for the second elastomeric material contained in the first elastomeric material will preferably not exceed approximately 1.5 phr.

A very good, mechanical strength in the seam area of the two sealing sections is already achieved with approximately 0.5 phr while no influence on the thermal and/or chemical stability of the first elastomeric material is essentially observed.

When a proportion of the cross-linking agent for the second elastomeric material of approximately 1.0 phr is used, a maximum effect for the strength of the seam area is already achieved without unwanted impairments of the thermal and/or chemical stability or load-bearing capacity of the AEM elastomer being observed.

The proportion of the cross-linking agent for the second elastomeric material as component of the first cross-linking system may be accompanied by an associated promoter for the cross linking of the second elastomeric material with a proportion of approximately 0.25 phr or more. Such a proportion of the promoter in the first elastomeric material already allows a noticeable shortening of the thermal hardening procedure without the strength of the seam area suffering.

A proportion of the promoter of approximately 0.75 phr will often be noted in this case as upper limit because a noticeable improvement in the effect of the promoter used will no longer be observed with proportions which exceed this. An optimum is often achieved with proportions of approximately 0.5 phr.

In the otherwise customary ratios between promoter and cross-linking agent, on the one hand, and optional activators, on the other hand, activators can also be used which have already been mentioned above in conjunction with the discussion of the second cross-linking system.

The ratios of the proportions of activators, promoters and cross-linking agents in relation to one another, as known per se, are preferably to be followed in this case, as well.

If a material based on an ACM elastomer is used as first elastomeric material, a proportion of the cross-linking agent for the second elastomeric material of approximately 0.25 phr or more is recommended. The maximum proportion which is recommended is at approximately 1.5 phr or less. Optimum results are already achieved with proportions of approximately 0.5 phr.

If a promoter for the cross linking of the second elastomeric material is also added to the first, ACM-based elastomeric material, approximately 0.25 phr are recommended as lower limit for the proportion of the promoter in the first elastomeric material. The recommended upper limit for the use of a promoter for the second elastomeric material is approximately 0.75 phr or less, based on the weight content of the ACM elastomer. Very good results are already achieved with approximately 0.5 phr.

As for the rest, the recommendations of the elastomer manufacturer can be followed for the dosing of the first cross-linking system in the first elastomer and the second cross-linking system in the second elastomer. This also applies, in particular, for the respective proportions of cross-linking agents, promoters and, where applicable, activators.

The elastomeric sealing elements according to the invention may essentially consist completely of elastomeric material, in which they form, for example, a sheet material with a thickness of one to several millimeters which can be handled as such.

In other applications, the elastomeric sealing material according to the invention comprises a substrate, in particular, a plastic substrate, an inorganic substrate or a metallic support, for example, a metal sheet.

In the case of the sealing elements according to the invention, the substrate will be embedded in the first and/or second elastomeric material, at least in sections, in accordance with one embodiment of the invention.

In this respect, the substrate undertakes a reinforcing function for the elastomeric sealing element. The layer thickness of the elastomeric materials can, in this case, be minimized. Typical layer thicknesses are in a broad range of approximately 5 µm to approximately 10 mm or more.

In application ranges of this type, the substrate will often be embedded in the first and the second elastomeric materials, wherein the substrate is, in several cases, preferably embedded completely in the first and in the second elastomeric materials, i.e., is not freely accessible in these cases at the upper surface at any point of the elastomeric sealing element. In other words, the substrate is then enveloped completely by the first and the second elastomeric materials and protected against chemical attacks.

In an alternative embodiment, the first and the second elastomeric materials form a coating on the substrate, wherein the coating can be applied to the substrate in certain areas or, however, the substrate can have a coating consisting of the first and the second elastomeric materials over its entire surface.

In order to achieve a better adhesion between the substrate, in particular, a metallic support, on the one hand, and the elastomeric materials, on the other hand, the use of an adhesion agent is generally to be recommended.

It has surprisingly been found that on account of the configuration of the elastomeric materials in accordance with the present invention, a uniform adhesion agent can be used, irrespective of the fact that two elastomeric materials which have completely different chemical properties can be used for the coating of the metallic support. On account of the use of a cross-linking system which contains a cross-linking agent of the other elastomeric material, the adhesion agent can be adjusted to this cross-linking agent of the other elastomeric material which is present not only in the first but also in the second elastomeric material.

As a result, optimum adhesion strengths of the sealing sections on a metallic support may be achieved and so those elastomeric sealing elements which include a metallic support can also be subjected to considerable mechanical loads.

The invention relates, in addition, to a process for the production of an elastomeric sealing element of the type described above, wherein the process comprises the steps:

Preparation of the first elastomeric material and the second elastomeric material, formation of a first and a second sealing section consisting of the first and second elastomeric materials, respectively, in such a manner that the two sections form a seam area, in which they border directly on one another, i.e., are in direct contact with one another, and Hardening of the two elastomeric materials with formation of a material joining thereof in the seam area.

Various processes offer themselves for the production of the sealing sections according to the present invention, in particular, the injection molding process, the transfer molding process or also the compression molding process. Additional, suitable, formative processes are the extrusion and the calendering processes.

In this case, the first and the second elastomeric materials are conveyed via separate channels with a so-called 2-component technology into the areas, in which the first and second sealing sections, respectively, are intended to be formed. The seam area can, for example, be predetermined in a simple manner by way of a so-called balancing of the injection paths. At the location of the seam, the two elastomeric materials border directly on one another and combine chemically to form an essentially uniform sealing material at the location of the seam, as well, at least as far as the mechanical strength characteristics are concerned.

The process according to the invention may be used not only for processes, in which the elastomeric materials are injected into a mold, but also for those processes, with which the sealing sections are produced areally on a mechanical support by means of a coating process. In this respect, the metallic support can be provided, as already described above, with a uniform layer of adhesion agent, irrespective of the fact that different areas of the metallic support come into contact with different elastomeric materials and must also be joined to them.

The invention allows a minimization of the production costs of the elastomeric sealing elements according to the invention, with which the less expensive elastomeric materials, for example, the recommended AEM or ACM elastomeric materials can be used in areas which are less critical with respect to thermal and/or chemical resistance. In the other areas, in which high or highest demands are placed on the thermal and/or chemical resistance of the elastomeric material, FKM elastomeric materials are recommended, in particular. On account of the configuration of the elastomeric materials according to the invention, it is ensured that the elastomeric sealing element has as a whole an adequate mechanical strength despite the use of different elastomeric materials and the seam area, in which the two elastomeric materials border directly on one another, is designed such that they have no weak point with respect to the mechanical strength of the elastomeric sealing element.

These and further advantages of the present invention will be explained in greater detail in the following on the basis of examples and in conjunction with the Figures of the drawings.

DETAILED DESCRIPTION OF THE INVENTION

Examples 1 and 2

In the present example, an elastomeric sealing element is described in its production and properties, with which the first elastomeric material is based on an AEM elastomeric material (Example 1) or an ACM elastomer (Example 2) and the second elastomeric material on an FKM elastomer.

The composition of the first elastomeric material (AEM or ACM based) according to these Examples 1 and 2 is apparent from the following Table 1, the composition of the FKM elastomer from Table 2. The ingredients of the compositions are specified in Tables 1 and 2 in parts by weight.

TABLE 1

| Composition Ingredients | Example 1 | Example 2 |
| --- | --- | --- |
| AEM, diaminically cross-linking | 100 | — |
| ACM, diaminically cross-linking | — | 100 |
| Carbon black | 56 | 70 |
| Softening agent | 17 | 4 |
| Processing aid | 2.5 | 3.5 |
| Anti-aging agent | 2 | 2 |
| HMDC hexamethylene diamine carbamate 75% | 1.4 | 0.7 |
| DOTG di-orthotolyl guanine | 4 | 2.0 |
| Bisphenol AF (FKM cross-linking agent) | 0.5 | 0.5 |
| Phosphonium chloride (FKM promoter) | 0.5 | 0.5 |
| Ca(OH)$_2$ | 0.5 | 0.5 |

The AEM elastomer used in Example 1 was Vamac G from DuPont.

Comparable results may be achieved with other, diaminically cross-linking Vamac types, such as, e.g., GLS and 3040.

The diaminically cross-linking ACM elastomer used in Example 2 was Nipol AR of the Zeon company which is also obtainable on the market as Hytemp AR. An alternative ACM elastomer which gives comparable results is TOA Acron of Tohpe Corp. or Noxtite of Unimatec Corp.

The composition for the second elastomeric material (FKM based) is summarized in Table 2.

In the present Examples, the standard grade Tenoflon FOR 432 (obtainable from Solvay Solexis) was used.

Additional FKM elastomers which can preferably be used, are those which do not require any tempering.

TABLE 2

| FKM, bisphenolically cross-linking, e.g., with a partially integrated cross-linking system* | 100 |
| --- | --- |
| Carbon black | 20 |
| Processing aid | 1.5 |
| MgO | 5 |
| *Bisphenol AF (FKM cross-linking agent) | 0.2 |
| *Phosphonium chloride (FKM promoter) | 0.2 |
| Ca(OH)$_2$ | 3 |

Figure 2:
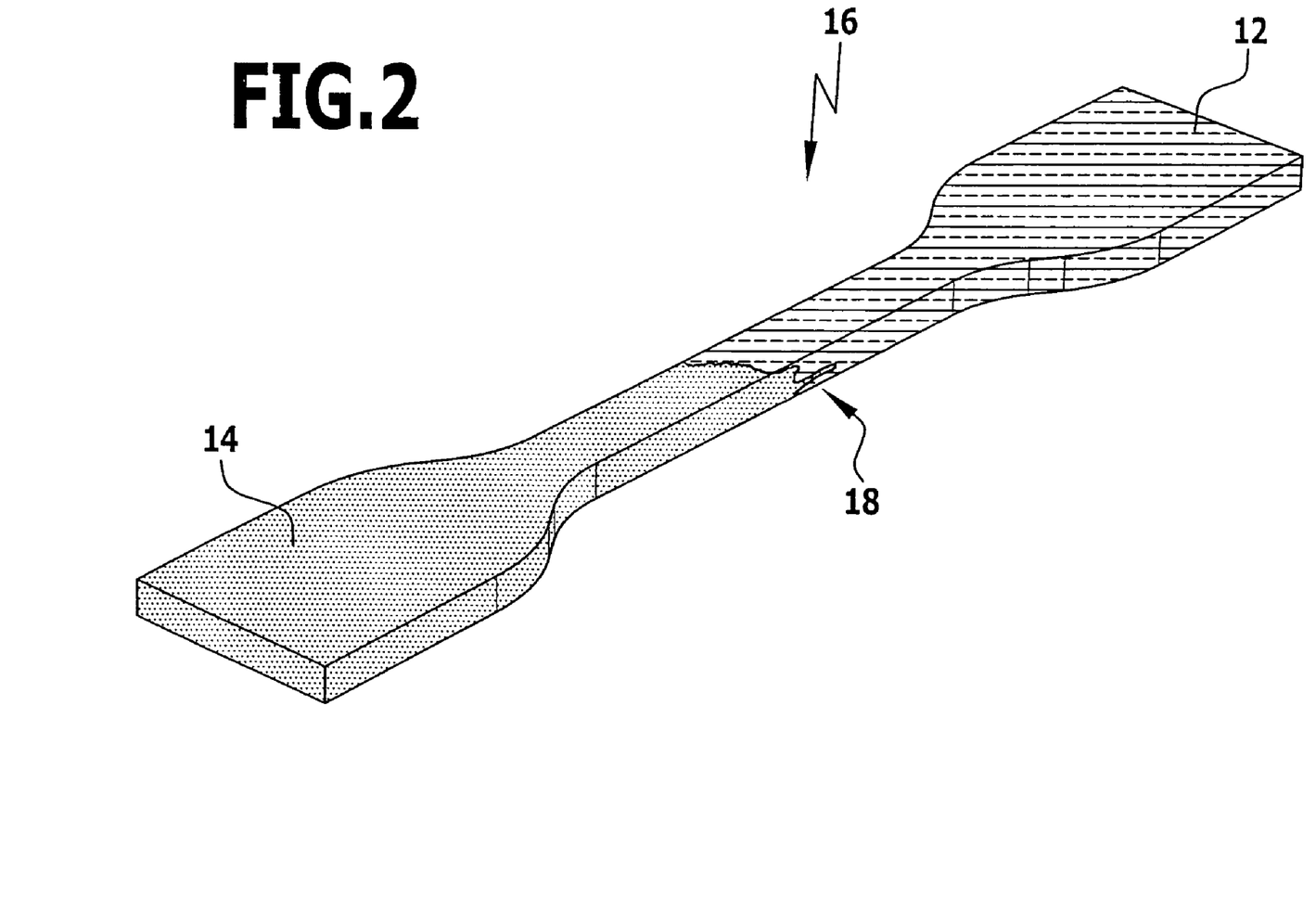
FIG. 2 sample member obtained from the sealing material of FIG. 1.

In accordance with one alternative, the first and second elastomeric materials are injected in an injection molding process (IM) into a mold which has a cavity with the dimensions as defined in the Standard DIN 53504 S2 (cf. also illustration in FIG. 2).

Figure 1:
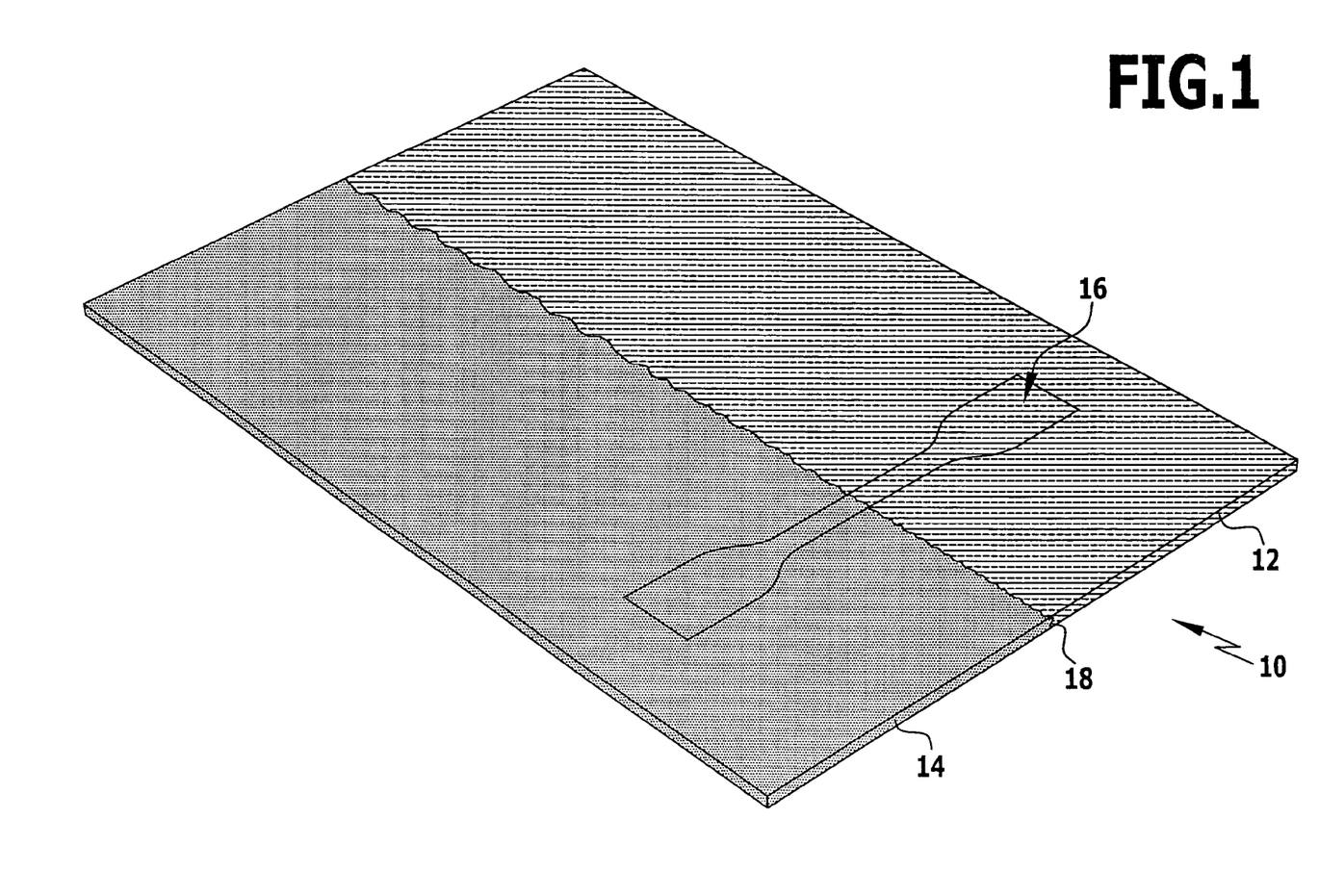
FIG. 1 elastomeric sealing material according to the present invention.

In accordance with another alternative, the elastomeric materials can be filled into a mold by means of compression molding, with which sheet materials 10 as illustrated in FIG. 1 are obtained. The dimensions are, for example, 150×150×2 mm$^3$. One half 12 of the sheet material 10 is formed by the first elastomeric material, the other half 14 by the second elastomeric material. A sample member 16, with which the cross section at the seam 18 is approximately 2×4 mm$^2$, is punched out of the sheet material (cf. FIG. 2).

The temperature of the mold during injection (IM process) was approximately 180° C. The temperature of the elastomeric materials during injection should be in the range of approximately 60 to 90° C. in order to avoid any premature commencement of the cross-linking reaction. In the mold, the two elastomeric materials, which form a first and a second sealing section, are hardened at a temperature of approximately 180° C. during a defined heating time, e.g., 10 minutes to form a sheet material (cf. FIG. 1).

The elastomeric sealing element is then removed from the hot mold.

Sample members in the shape illustrated in FIG. 2 are punched from the cooled sheet material which has been formed (DIN 53504 S2) and subjected to tensile strength tests with the results contained in Table 3.

TABLE 3

Composite Strength of the AEM/ACM-FKM Compounds

| Example No. | Tear Strength [MPa] | Breaking Elongation [%] | Tensile Module 100% [MPa] | Tensile Module 200% [MPa] |
| --- | --- | --- | --- | --- |
| 1 (untempered) | 5.46 | 244 | 2.07 | 4.43 |
| 2 (untempered) | 6.15 | 245 | 2.27 | 4.96 |
| 2 (tempered) | 8.21 | 242 | 2.86 | 7.19 |

The sheet material obtained in Example 2 was tempered in a circulating air oven at 175° C. for 6 hours and then displays a considerably improved tear strength. The value for the breaking elongation remains to a great extent unchanged, the tensile modules 100% and 200% display a higher module rigidity (cf. Table 3).

Examples 3 to 11

Comparative Example 1

Example 1 was repeated with the changes in the composition of the cross-linking agent in the first elastomeric material which are given in Table 4. The proportions of the components are specified in parts by weight. The second elastomeric material was, in all these Examples, that defined in Table 2.

The values thereby found on the basis of the tensile strength tests for the samples, which were obtained analogously to Example 1, are given in Table 5.

TABLE 4

| Composition Ingredients | Comparative Example 1 | Example 3 | Example 4 | Example 5 | Example 6 | Example 7 | Example 8 | Example 9 | Example 10 | Example 11 |
|---|---|---|---|---|---|---|---|---|---|---|
| AEM, Vamac polymer | 100 | 100 | 100 | 100 | 100 | 100 | 100 | 100 | 100 | 100 |
| Carbon black | 56 | 56 | 56 | 56 | 56 | 56 | 56 | 56 | 56 | 56 |
| Softening agent | 17 | 17 | 17 | 17 | 17 | 17 | 17 | 17 | 17 | 17 |
| Processing aid | 2.5 | 2.5 | 2.5 | 2.5 | 2.5 | 2.5 | 2.5 | 2.5 | 2.5 | 2.5 |
| Anti-aging agent | 2 | 2 | 2 | 2 | 2 | 2 | 2 | 2 | 2 | 2 |
| HMDC hexamethylene diamine carbamate 75% | 1.4 | 1.4 | 1.4 | 1.4 | 1.4 | 1.4 | 1.4 | 1.4 | 1.4 | 1.4 |
| DOTG di-orthotolyl guanine | 4 | 4 | 4 | 4 | 4 | 4 | 4 | 4 | 4 | 4 |
| Bisphenol AF (FKM cross-linking agent) | — | 1.0 | 1.0 | 0.5 | 1.0 | 0.5 | 1.0 | 1.0 | 0.5 | 1.0 |
| Phosphonium chloride (FKM promoter) | — | 0.5 | 0.5 | 0.25 | 0.25 | 0.25 | 0.25 | 0.5 | 0.5 | 0.5 |
| $Ca(OH)_2$ | — | 0.25 | 0.35 | 0.5 | 0.5 | 1.0 | 1.0 | 0.5 | 1.0 | 1.0 |

TABLE 5

Composite Strength of the AEM-FKM Compounds, untempered

| Example No. | Tear Strength [MPa] | Breaking Elongation % | Tensile Module 100% [MPa] | Tensile Module 200% [MPa] |
|---|---|---|---|---|
| Comparative Example 1 | No chemical bonding | | | |
| 3 | Still no satisfactory chemical bonding | | | |
| 4 | 3.37 | 209 | 1.29 | 2.91 |
| 5 | 4.66 | 203 | 2.02 | 4.49 |
| 6 | 4.48 | 221 | 1.92 | 4.11 |
| 7 | 5.42 | 238 | 2.25 | 4.23 |
| 8 | 4.77 | 220 | 2.14 | 4.22 |
| 9 | 5.50 | 251 | 1.96 | 4.30 |
| 10 | 5.35 | 215 | 2.34 | 4.98 |
| 11 | 5.24 | 200 | 2.49 | 6.65 |

Comparative Example 1 serves the purpose of checking the strength values of the compound of Examples 1 and 3 to 11 in comparison with the strength of the unchanged AEM material as such in relation to the FKM material.

Example 3 shows that a content of $Ca(OH)_2$ of 0.25 phr in the AEM elastomer composition still does not deliver any satisfactory chemical bonding of the elastomeric materials AEM and FKM in the seam area.

Figure 3:
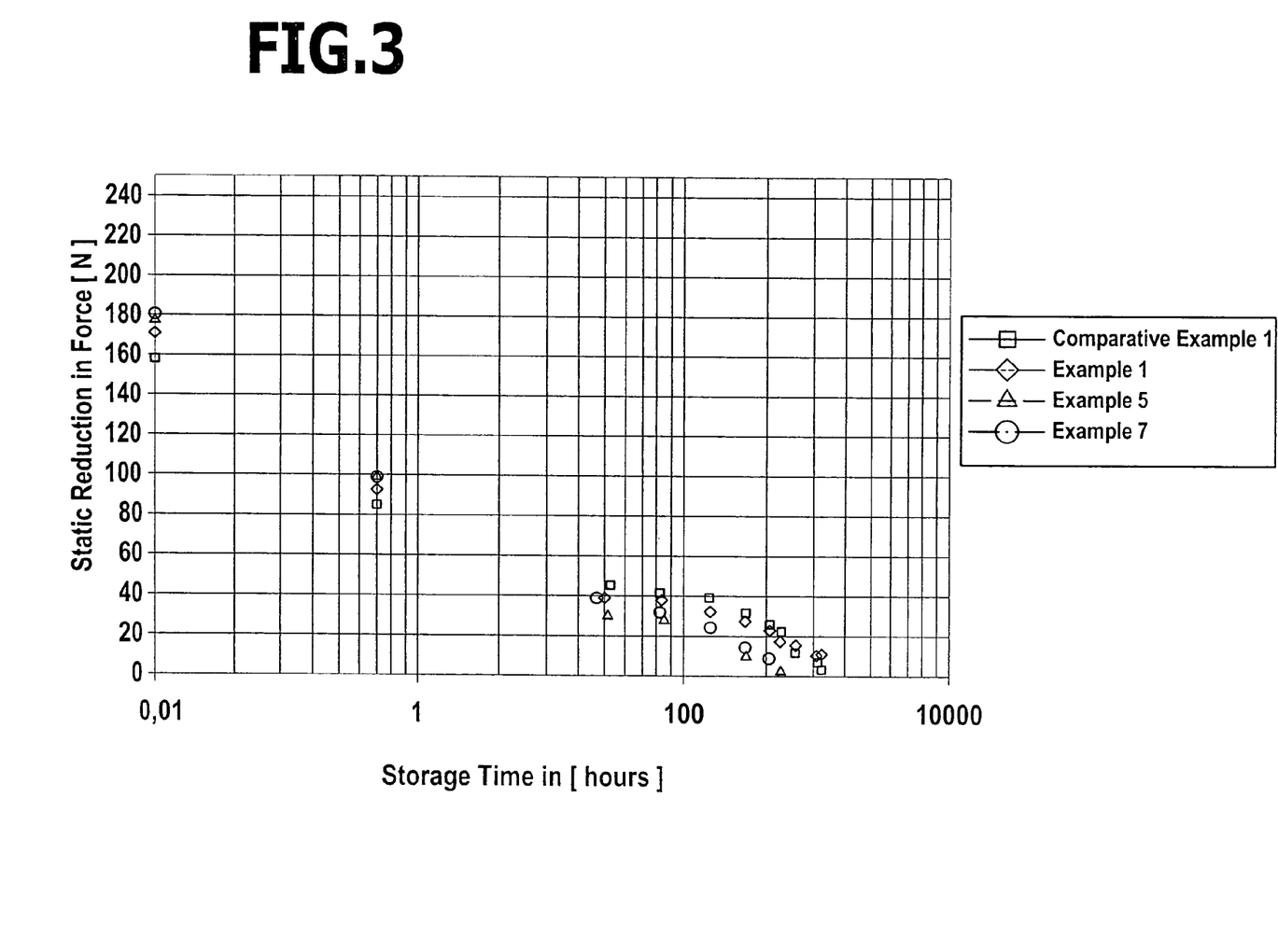
FIG. 3 a diagram showing the static reduction in force obtained in tensile strength tests versus storage time.

FIG. 3 shows for Examples 1, 5 and 7 as well as Comparative Example 1 the results of a long-term test, with which the static long-term sealing force with isothermal hot air aging (T=150° C.) was registered (pressure-tension-relaxation measurements or CSR testing). In this respect, the static reduction in force is plotted over the storage time. The static reduction in force was measured at 23° C. and an initial pressing of 25%. The measurement methodology used (by analogy with ASTM D 6147) is described in the publication of R. Hornig in GAK (Gummi Fasern Kunststoffe, Zeitschrift für die Polymerindustrie=Rubber Fibers Plastics, Periodical for the Polymer Industry) 58, September 2005, pages 567 to 574. The initial values of Examples 1, 5 and 7 are slightly above the values of Comparative Example 1. In the case of longer test and storage times, respectively, leakage values are achieved with an optimized cross-linking system which are close to the values of Comparative Example 1 (AEM starting composition without the addition of FKM cross-linking agent) and are even, in part, slightly better.

This shows that as a result of the selection of the cross-linking systems according to the invention, an excellent bonding of the elastomers, which are as such incompatible, in the seam area can be achieved, on the one hand, while the long-term sealing behavior is scarcely affected and, in the ideal case, (cf. Example 1) even delivers even better values than the material of Comparative Example 1.

Table 6 shows on the basis of the material data of the individual AEM elastomeric materials of Examples 1 and 3 to 11 as well as Comparative Example 1 that the mechanical properties alter only insubstantially with the adding of the cross-linking agent for the FKM elastomer to the AEM elastomer. The values specified in Table 6 are measured on tempered samples, the tempering conditions were the same as those described in conjunction with Example 2.

TABLE 6

Mechanical Properties of the AEM Elastomer, tempered

| Example No. | Tear Strength [MPa] | Breaking Elongation % | Tensile Module 100% [MPa] | Tensile Module 200% [MPa] | Tensile Module 300% [MPa] |
|---|---|---|---|---|---|
| Comparative Example 1 | 12.46 | 340 | | | |
| 1 | 17.3 | 434 | 2.10 | 6.37 | 11.50 |
| 3 | 13.09 | 495 | 1.61 | 3.88 | 6.70 |
| 4 | 13.87 | 433 | 1.31 | 3.59 | 6.38 |

TABLE 6-continued

Mechanical Properties of the AEM Elastomer, tempered

| Example No. | Tear Strength [MPa] | Breaking Elongation % | Tensile Module 100% [MPa] | Tensile Module 200% [MPa] | Tensile Module 300% [MPa] |
|---|---|---|---|---|---|
| 5 | 17.0 | 455 | 1.85 | 6.05 | 11.32 |
| 6 | 17.2 | 440 | 1.90 | 6.24 | 11.52 |
| 7 | 17.8 | 383 | 2.80 | 8.33 | 14.15 |
| 8 | 17.8 | 407 | 2.50 | 7.65 | 13.24 |
| 9 | 15.7 | 418 | 1.90 | 5.72 | 10.52 |
| 10 | 18.2 | 398 | 2.90 | 8.44 | 14.14 |
| 11 | 17.2 | 404 | 2.50 | 7.48 | 12.86 |

The invention claimed is:

1. Elastomeric sealing element, comprising a first and a second sealing section, wherein the first sealing section is produced with the use of a first elastomeric material containing a first cross-linking system, wherein the second sealing section is produced with the use of a second elastomeric material containing a second cross-linking system, wherein the first and the second sealing sections border directly on one another in a seam area and their elastomeric materials are materially joined to one another in the seam area, wherein the first elastomeric material comprises an AEM elastomer, an ACM elastomer or mixtures thereof, wherein at least one of the two cross-linking systems comprises, in addition, a cross-linking agent for the respectively other elastomeric material, wherein the first cross-linking system for the first elastomeric material comprises a diaminic cross-linking agent and a promoter of the guanidine group or a promoter of the tertiary amine group.

2. Elastomeric sealing element as defined in claim 1, characterized in that the second elastomeric material comprises an FKM elastomer.

3. Elastomeric sealing element as defined in claim 1, characterized in that the first elastomeric material comprises an AEM elastomer or an ACM elastomer, that the second elastomeric material comprises an FKM elastomer and that the cross-linking system contained in the first elastomeric material contains an activator for the second elastomeric material.

4. Elastomeric sealing element as defined in claim 1, further comprising a substrate in the form of a metallic support, a plastic substrate or an inorganic substrate.

5. Elastomeric sealing element as defined in claim 4, characterized in that the substrate is embedded in the first and/or second elastomeric material at least in sections.

6. Elastomeric sealing element as defined in claim 5, characterized in that the substrate is embedded in the first and second elastomeric materials.

7. Elastomeric sealing element as defined in claim 4, characterized in that the first and the second elastomeric materials form a coating on the substrate.

8. Elastomeric sealing element as defined in claim 4, characterized in that the substrate is coated with a uniform adhesion agent.

9. Elastomeric sealing element, comprising a first and a second sealing section, wherein the first sealing section is produced with the use of a first elastomeric material containing a first cross-linking system, wherein the second sealing section is produced with the use of a second elastomeric material containing a second cross-linking system, wherein the first and the second sealing sections border directly on one another in a seam area and their elastomeric materials are materially joined to one another in the seam area, wherein the first elastomeric material comprises an AEM elastomer or an ACM elastomer, wherein the second elastomeric material comprises an FKM elastomer, wherein at least one of the two cross-linking systems comprises, in addition, a cross-linking agent for the respectively other elastomeric material, and wherein the first cross-linking system contained in the first elastomeric material contains an activator for the second elastomeric material.

10. Elastomeric sealing element as defined in claim 9, characterized in that the first elastomeric material is incompatible with the second elastomeric material yet the seam area has a tensile strength corresponding essentially to or better than the lesser tensile strength of the first elastomeric material or the second elastomeric material.

11. Elastomeric sealing element as defined in claim 9, characterized in that the first elastomeric material comprises the AEM elastomer, the ACM elastomer or mixtures thereof.

12. Elastomeric sealing element as defined in claim 11, characterized in that first cross-linking system for the first elastomeric material comprises a diaminic cross-linking agent.

13. Elastomeric sealing element as defined in claim 12, characterized in that the diaminic cross-linking agent is selected from hexamethylene diamine, hexamethylene diamine carbamate, N,N-dicinnamylide diamine carbamate, 4,4-diaminodicyclohexylmethane, m-xylene diamine, 4,4-diaminodiphenylmethane, 4,4-diaminodiphenyl ether and/or 2,2-bis[4-(4-aminophenoxy)phenyl]propane.

14. Elastomeric sealing element as defined in claim 12, characterized in that the first cross-linking system comprises a promoter of the guanidine group or a promoter of the tertiary amine group.

15. Elastomeric sealing element as defined in claim 12, characterized in that the first cross-linking system comprises a promoter comprising alkylated ammonium bromide.

16. Elastomeric sealing element as defined in claim 11, characterized in that the first elastomeric material comprises an AEM elastomer or an ACM elastomer and that the proportion of a promoter for the cross linking of the second elastomeric material contained in the first elastomeric material is approximately 0.25 phr or more.

17. Elastomeric sealing element as defined in claim 9, characterized in that the second cross-linking system for the second elastomeric material comprises a phenolic cross-linking agent.

18. Elastomeric sealing element as defined in claim 17, characterized in that the phenolic cross-linking agent is selected from bisphenol AF and bisphenol A.

19. Elastomeric sealing element as defined in claim 17, characterized in that the second cross-linking system comprises a promoter comprising Phosphonium salt.

20. Elastomeric sealing element as defined in claim 9, characterized in that the second cross-linking system comprises an activator.

21. Elastomeric sealing element as defined in claim 20, characterized in that the activator comprises an alkali or alkaline earth hydroxide or oxide or PbO.

22. Elastomeric sealing element as defined in claim 9, characterized in that the first cross-linking system contains a proportion of a cross-linking agent for the second elastomeric material.

23. Elastomeric sealing element as defined in claim 22, characterized in that the first elastomeric material comprises an AEM elastomer or an ACM elastomer and that the proportion of the cross-linking agent for the second elastomeric material contained in the first elastomeric material is approximately 0.25 phr or more.

24. Elastomeric sealing element as defined in claim 22, characterized in that the first elastomeric material comprises an AEM elastomer or an ACM elastomer and that the proportion of the cross-linking agent for the second elastomeric material contained in the first elastomeric material is approximately 1.5 phr or less.

25. Elastomeric sealing element as defined in claim 22, characterized in that the first elastomeric material comprises an AEM elastomer or an ACM elastomer and that the proportion of the promoter for the cross linking of the second elastomeric material contained in the first elastomeric material is approximately 0.75 phr or less.

26. Elastomeric sealing element as defined in claim 9, characterized in that the activator is selected from alkali and alkaline earth hydroxides and oxides and that its proportion in the first elastomeric material is approximately 0.35 phr or more.

27. Elastomeric sealing element as defined in claim 9, characterized in that the proportion of the activator in the first elastomeric material is approximately 1.0 phr or less.

28. Elastomeric sealing element as defined in claim 27, characterized in that the proportion of the activator in the first elastomeric material is in the range of approximately 0.4 to approximately 0.6 phr.

29. Elastomeric sealing element as defined in claim 9, characterized in that the activator comprises $Ca(OH)_2$.

30. Elastomeric sealing element, comprising a first and a second sealing section, wherein the first sealing section is produced with the use of a first elastomeric material containing a first cross-linking system, wherein the second sealing section is produced with the use of a second elastomeric material containing a second cross-linking system, wherein the first and the second sealing sections border directly on one another in a seam area and their elastomeric materials are materially joined to one another in the seam area, wherein the first elastomeric material comprises an AEM elastomer, an ACM elastomer or mixtures thereof, wherein at least one of the two cross-linking systems comprises, in addition, a cross-linking agent for the respectively other elastomeric material, wherein the first cross-linking system for the first elastomeric material comprises a diaminic cross-linking agent and a promoter comprising alkylated ammonium bromide.

31. Elastomeric sealing element, comprising a first and a second sealing section, wherein the first sealing section is produced with the use of a first elastomeric material containing a first cross-linking system, wherein the second sealing section is produced with the use of a second elastomeric material containing a second cross-linking system, wherein the first and the second sealing sections border directly on one another in a seam area and their elastomeric materials are materially joined to one another in the seam area, wherein the first elastomeric material comprises an AEM elastomer or an ACM elastomer, wherein at least one of the two cross-linking systems comprises, in addition, a cross-linking agent for the respectively other elastomeric material, and wherein the first cross-linking system contains a proportion of a cross-linking agent for the second elastomeric material, said proportion contained in the first elastomeric material being approximately 0.25 phr or more.

32. Elastomeric sealing element, comprising a first and a second sealing section, wherein the first sealing section is produced with the use of a first elastomeric material containing a first cross-linking system, wherein the second sealing section is produced with the use of a second elastomeric material containing a second cross-linking system, wherein the first and the second sealing sections border directly on one another in a seam area and their elastomeric materials are materially joined to one another in the seam area, wherein the first elastomeric material comprises an AEM elastomer or an ACM elastomer, wherein at least one of the two cross-linking systems comprises, in addition, a cross-linking agent for the respectively other elastomeric material, and wherein the first cross-linking system contains a proportion of a cross-linking agent for the second elastomeric material, said proportion contained in the first elastomeric material being approximately 1.5 phr or less.

33. Elastomeric sealing element, comprising a first and a second sealing section, wherein the first sealing section is produced with the use of a first elastomeric material containing a first cross-linking system, wherein the second sealing section is produced with the use of a second elastomeric material containing a second cross-linking system, wherein the first and the second sealing sections border directly on one another in a seam area and their elastomeric materials are materially joined to one another in the seam area, wherein the first elastomeric material comprises an AEM elastomer or an ACM elastomer, wherein at least one of the two cross-linking systems comprises, in addition, a cross-linking agent for the respectively other elastomeric material, and wherein a promoter contained in the first elastomeric material for the cross linking of the second elastomeric material is approximately 0.25 phr or more.

34. Elastomeric sealing element, comprising a first and a second sealing section, wherein the first sealing section is produced with the use of a first elastomeric material containing a first cross-linking system, wherein the second sealing section is produced with the use of a second elastomeric material containing a second cross-linking system, wherein the first and the second sealing sections border directly on one another in a seam area and their elastomeric materials are materially joined to one another in the seam area, wherein the first elastomeric material comprises an AEM elastomer or an ACM elastomer, wherein at least one of the two cross-linking systems comprises, in addition, a cross-linking agent for the respectively other elastomeric material, and wherein a promoter contained in the first elastomeric material for the cross linking of the second elastomeric material is approximately 0.75 phr or less.

* * * * *

UNITED STATES PATENT AND TRADEMARK OFFICE
CERTIFICATE OF CORRECTION

PATENT NO. : 8,177,239 B2  Page 1 of 1
APPLICATION NO. : 11/881583
DATED : May 15, 2012
INVENTOR(S) : Roy Hornig It is certified that error appears in the above-identified patent and that said Letters Patent is hereby corrected as shown below:

Column 12, Claim 19, line 67, replace --Phosphonium-- with --phosphonium--.

Signed and Sealed this
Tenth Day of July, 2012

David J. Kappos
*Director of the United States Patent and Trademark Office*